US005217238A

United States Patent [19]

Cyphers et al.

[11] Patent Number: 5,217,238

[45] Date of Patent: Jun. 8, 1993

[54] CONVERTIBLE CART FOR PAINT SPRAYERS

[75] Inventors: Norman A. Cyphers, Rogers; Wayne M. Bekius, Milaca, both of Minn.

[73] Assignee: Wagner Spray Tech Corporation, Minneapolis, Minn.

[21] Appl. No.: 697,753

[22] Filed: May 9, 1991

[51] Int. Cl.[5] .......... B62B 1/04

[52] U.S. Cl. .......... 280/47.18; 280/652; 280/47.34; 280/79.6; 417/234

[58] Field of Search .......... 280/652, 659, 47.18, 280/47.19, 47.21, 47.24, 47.28, 47.315, 47.34, 47.371, 47.33, 47.39, 47.41; 180/6.2; 239/150, 149, 146; 401/146, 188 R; 417/413, 234, 572, 361

[56] References Cited

U.S. PATENT DOCUMENTS

| | | | |
|---|---|---|---|
| 2,812,895 | 11/1957 | Peeps | 417/234 |
| 3,305,137 | 2/1967 | Gauthier et al. | 417/234 |
| 3,433,415 | 3/1969 | Enssle | 417/234 |
| 4,588,318 | 5/1988 | O'Brien et al. | 401/146 |
| 4,787,827 | 11/1988 | Hinkle et al. | 417/234 |
| 5,073,092 | 12/1991 | Gebauer et al. | 417/383 |

OTHER PUBLICATIONS

Wagner Spray Tech Corp., Bull. SL00054, Mar. 1990.
Wagner Spray Tech Corp., Bull. SL00001, Nov. 1990.
Wagner Spray Tech Corp., Bull. L12172.
Wagner Spray Tech Corp., Bull. L12171.
Wagner Spray Tech Corp, Bull. L12170, Nov. 1990.
Wagner Spray Tech Corp., Bull. SL00096, Dec. 1990.

*Primary Examiner*—Richard M. Camby
*Attorney, Agent, or Firm*—Faegre & Benson

[57] ABSTRACT

A convertible cart for a paint sprayer alternatively supports a sprayer pump assembly in either a horizontal or an upright position. When used in the upright position, the pump assembly is positioned for use with a smaller sized paint container, and the container can be securely moved about with the cart. When used in the horizontal position, the pump assembly is positioned for use with a larger sized paint container, and alternatively flexible suction and return hoses permit suction from larger paint containers.

13 Claims, 2 Drawing Sheets

CONVERTIBLE CART FOR PAINT SPRAYERS

FIELD OF THE INVENTION

This invention provides a convertible cart for paint sprayers, such that the cart can readily be converted from supporting the pump assembly of the paint sprayer in an upright to a horizontal position, thus increasing flexibility with regard to the type and sizes of paint supply pails which can be used with the sprayer. The cart securely supports the sprayer in either position and can readily be wheeled about. A pail hook can be attached to the cart in the upright position to enable a relatively smaller sized pail to be carried safely as the cart is rolled.

BACKGROUND OF THE INVENTION

Airless sprayers for spraying liquid spray products, such as paints, stains, lacquers and the like are relatively large and heavy equipment. It is often necessary to move such equipment both to and from a job site and around different locations at the job site.

Also, depending on the requirements of the particular job, the liquid spray product may need to be used in relatively smaller sized containers, such as 5 gallon paint cans, or relatively larger sized containers, such as 20 gallon drums or larger. In order to access smaller sized containers, it has been found necessary to position certain types of airless sprayers, such as the Model ED1500 Airless Sprayer and the Model ED1300 Airless Sprayer manufactured by Wagner Spray Tech Corporation, Minneapolis, Minn., in a vertical position, while a horizontal position for the airless sprayer is necessary to access larger sized containers. It would be desirable to be able to move a smaller sized container with the vertically positioned airless sprayer, and it would be desirable to be able to position a larger sized container in a central location and move the horizontal airless sprayer from place to place at the job site.

It is thus an object of the present invention to provide a paint sprayer cart which would have such flexibility features.

SUMMARY OF THE INVENTION

A convertible cart for a paint sprayer alternatively supports a sprayer pump assembly in either a horizontal or an upright position. The generally U-shaped cart base has a long section and first and second short sections, each of which form essentially right angles at first and second ends, respectively, of the long section. The base is thus arranged for securely retaining a generally rectangular pump assembly along one of the pump assembly's long dimensions and two of the pump assembly's adjacent short dimensions, correspondingly. A wheeled axle is supported at the angle of the first short section and the first end of the long section. The angle of the second short section and the second end of the long section supports first retaining members. The end of the first short section distal from the first end of the long section supports a second retaining member.

When the airless sprayer pump assembly is supported in the horizontal position, the first retaining members together with the wheeled axle provide horizontal base support for the cart and a cart handle is releasably secured to the second retaining members. When the airless sprayer pump assembly is supported in the upright position, the second retaining members together with the wheeled axle provide horizontal base support for the cart and the cart handle is releasably secured to the first retaining members. The cart is moved from the horizontal to the upright position by pivoting about the wheeled axle and reversing the position of the handle between the first and second retaining members.

DETAILED DESCRIPTION OF THE INVENTION

Figure 1:
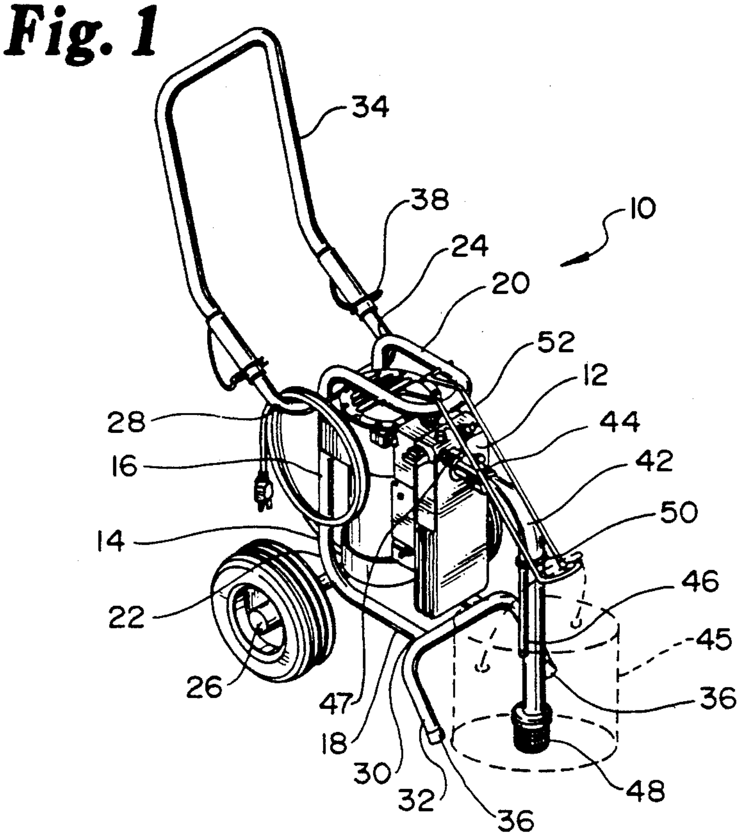
FIG. 1 illustrates the convertible cart of the present invention supporting the pump assembly in an upright position with a smaller paint container shown in phantom.
Figure 2:
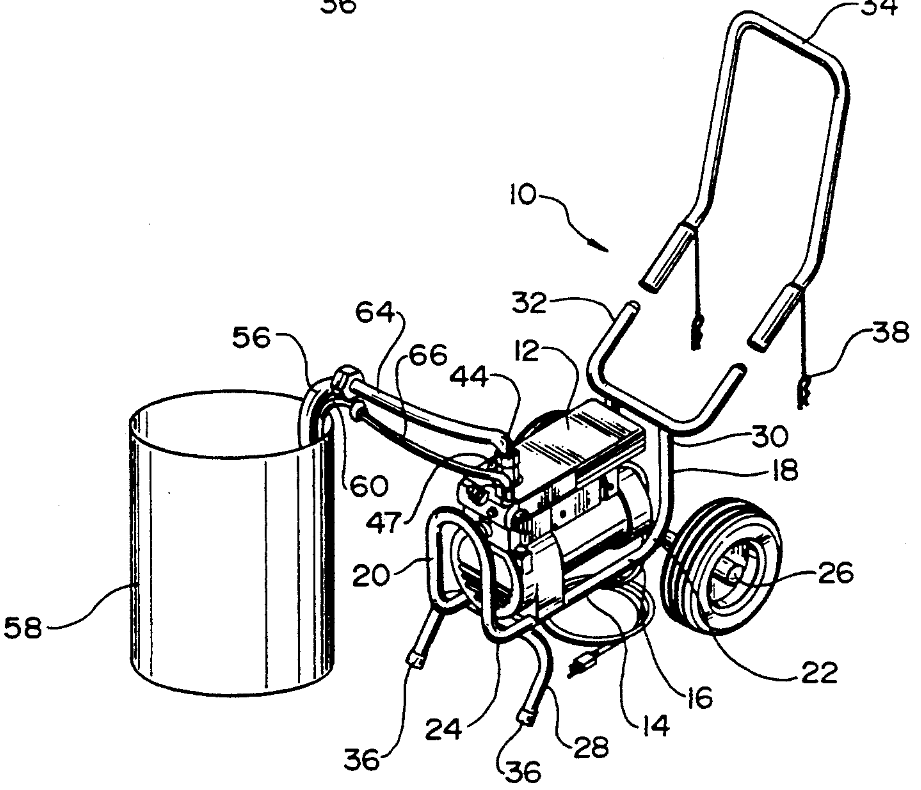
FIG. 2 illustrates the convertible cart of the present invention supporting the pump assembly in a horizontal position shown with a larger stationary paint container.
Figure 3:
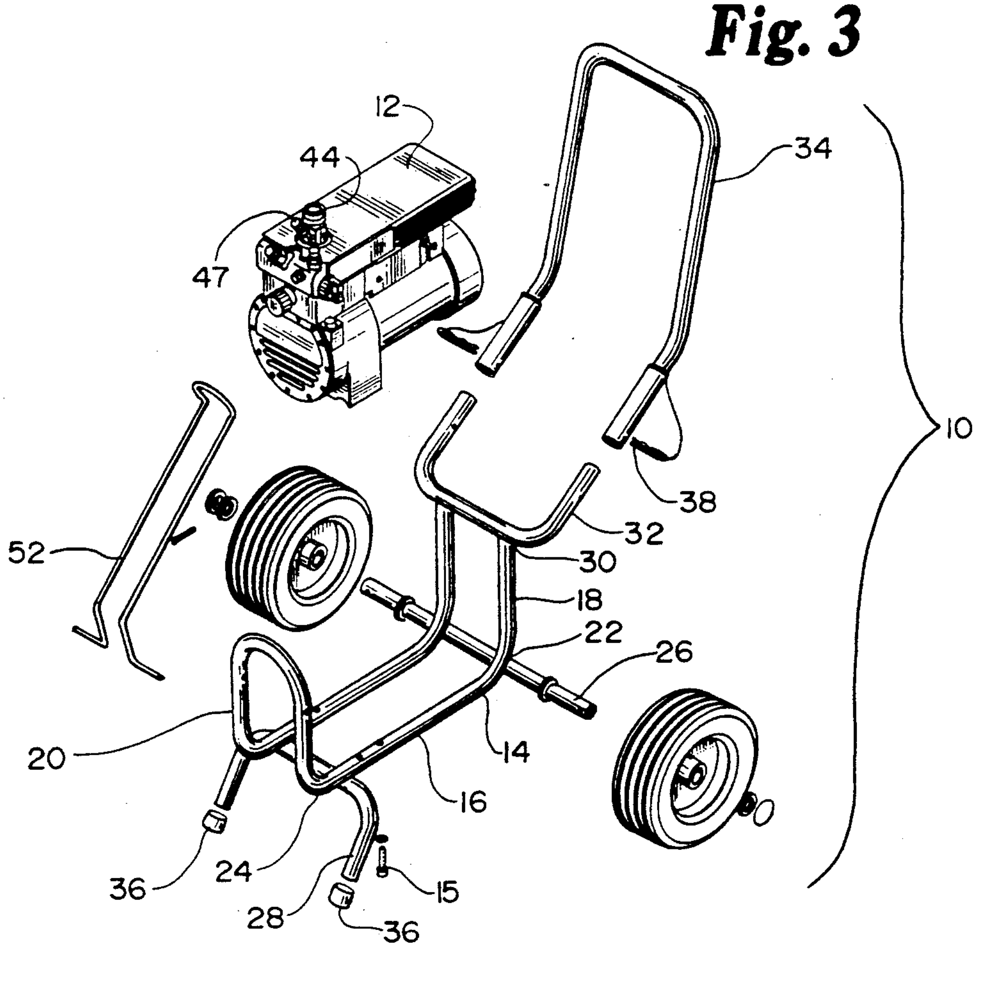
FIG. 3 is similar to the view shown in FIG. 1, with parts separated to show detail.

FIGS. 1, 2 and 3 illustrate convertible cart 10 for a paint sprayer for alternatively supporting pump assembly 12 in a horizontal position (see FIGS. 2 and 3) or an upright position (see FIG. 1). Generally U-shaped cart base 14 has long section 16 and first and second short sections 18, 20 forming essentially right angles at first and second ends 22, 24, respectively of long section 16. Cart base 14 is thus designed to securely retain generally rectangular pump assembly 12 along one long dimension and two adjacent short dimensions, correspondingly. Pump assembly 12 is preferably secured to cart base 14 by four cap screws 15 (see FIG. 3). A wheeled axle 26 is preferably welded to the cart base 14 at the intersection of first short section 18 and first end 22 of long section 16. First retaining member 28 is preferably welded to the intersection of second short section 20 and second end 24 of long section 16. Distal end 30 of first short section 18 is attached (preferably by welding) to second retaining member 32. Cart handle 34 and feet 36 are interchangeably attachable to first and second retaining members 28, 32 depending on whether the cart is to be used in the horizontal or vertical (upright) position, as will be described further herein.

It is to be noted that the pump assembly 12 is commercially available, for example, from Wagner Spray Tech Corporation, Minneapolis, Minn. and forms no part of this invention per se. It is thus not further described herein.

When paint sprayer pump assembly 12 is to be used in the horizontal position as shown in FIG. 2, first retaining member 28 together with the wheeled axle 26 provide horizontal base support for cart 10 and cart handle 34 is releasably secured to second retaining member 32. Non-skid end caps or feet 36 are attached to first retaining member 28 to prevent unwanted rolling and to prevent member 28 from marring a floor on which cart 10 may be resting.

When airless sprayer pump assembly 12 is to be used in the vertical position as shown in FIG. 1, second retaining member 32 together with wheeled axle 26 provide horizontal base support for cart 10 and cart handle 34 is releasably secured to first retaining member 28. Non-skid feet 36 are attached to second retaining member 32 to prevent unwanted rolling.

Cart handle 34 may be attached to retaining member 28 or 32 by any secure releasable means, such as cotter pins or keys 38.

Figure 5:
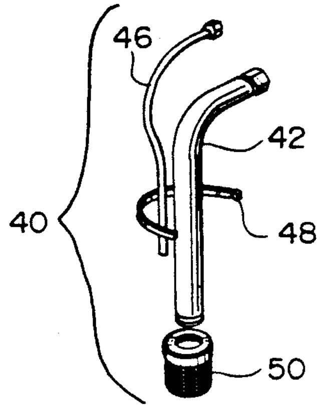
FIG. 5 illustrates the suction set assembly for use with the pump assembly in the vertical position, with parts separated to show detail.

FIGS. 1 and 5 illustrate a first suction tube assembly 40, for use when cart 10 is in the upright position, with suction tube 42 attached to housing inlet 44, to suck paint from container 45 and return tube 46 attached to housing outlet 47. Trap 48 and filter 50 complete first suction tube assembly 40. Pail hook 52 is pivotably and releasably secured to second short section 20 for hooking paint container 45 in position for suction by suction tube 42. When cart 10 is pivoted slightly from the upright position for wheeling cart 10, paint container 45 remains securely hooked by pail hook 52 and rests on second retaining member 32 for transport with cart 10.

Figure 4:
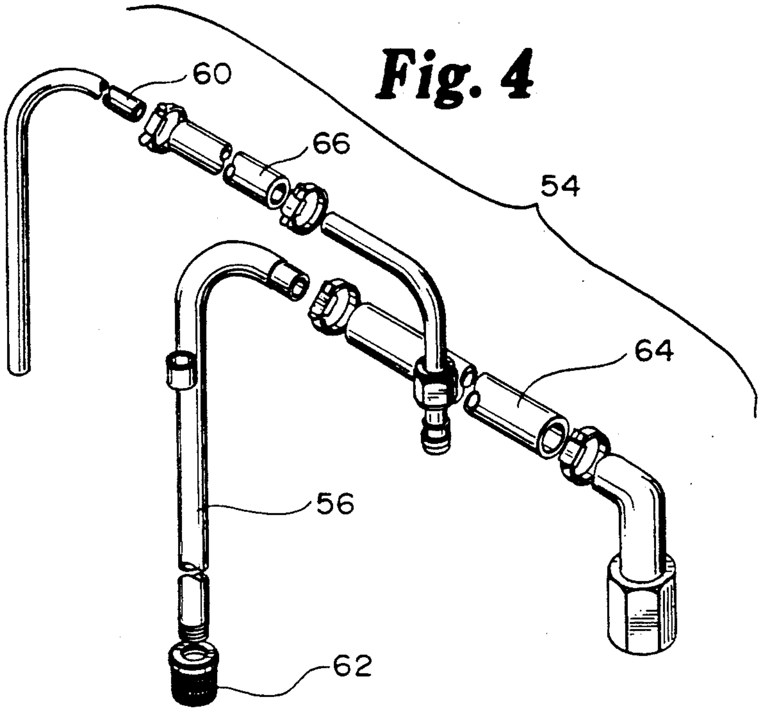
FIG. 4 illustrates the suction set assembly for use with the pump assembly in the horizontal position, with parts separated to show detail.

FIGS. 2 and 4 illustrate second suction tube assembly 54, for use when cart 10 is in the horizontal position, with suction tube 56 attached to housing inlet 44 to suck paint from container 58 and return tube 60 attached to housing outlet. Filter 62, suction hose 64 and return hose 66 complete second suction tube assembly 54.

The sprayer will generally be used with pump assembly 12 in the horizontal position when it is desired to use a larger sized paint container 58, such as a 20 gallon container or larger. Cart base 14 is positioned with long section 16 horizontal and supported on wheeled axle 26 and first retaining member 28 equipped with skid-resistant feet 36. Cart handle 34 is attached to second retaining member 32 and secured, as with cotter pins 38. Generally rectangular pump assembly 12 is positioned horizontally within cart base 14. Relatively rigid suction tube 56 is attached to housing inlet 44 to suck paint from container 58 and relatively rigid return tube 60 is attached to housing outlet 47. Filter 62 prevents paint skin and other detritus from entering pump assembly 12. Suction hose 64 and return hose 66, both relatively flexible, are preferably two and one-half feet in length to permit suction from a relatively large paint container 58.

The sprayer will generally be used with pump assembly 12 in the upright position when it is desired to use a smaller sized paint container 45, such as a 5 gallon container. Cart base 14 is positioned with first short section 18 horizontal and supported on wheeled axle 26 and second retaining member 32 equipped with skid-resistant feet 36. Cart handle 34 is attached to first retaining member 28 and secured, as with cotter pins 38. Generally rectangular pump assembly 12 is positioned vertically within cart base 14. Relatively rigid suction tube 42 is attached to housing inlet 44 to suck paint from container 45 and relatively rigid return tube 46 is attached to housing outlet 47. Trap 48 prevents paint skin and other detritus from entering pump assembly 12. Pail hook 52 is releasably secured to second short section 20 for hooking paint container 45 in position for suction by suction tube 42. When cart 10 is pivoted slightly from the upright position for wheeling cart 10, paint container 45 remains securely hooked by pail hook 52 and rests on second retaining member 32.

The cart frame is preferably formed of steel tubing, such as nickel plated cold rolled steel tubing with welded seams.

The invention is not to be taken as limited to all of the details thereof as modifications and variations thereof may be made without departing from the spirit or scope of the invention.

What is claimed is:

1. A convertible cart for a paint sprayer for alternatively supporting a pump assembly in a horizontal or an upright position comprising:

a generally U-shaped cart base having a long section and first and second short sections forming essentially right angles at first and second ends, respectively, of the long section for securely and releasably retaining a generally rectangular pump assembly along one of the pump assembly's long dimension and two of the pump assembly's adjacent short dimensions, correspondingly, the angle of the first short section and the first and of the long section supporting a wheeled axle, the angle of the second short section and the second end of the long section supporting first retaining member, and an end of the first short section distal from the first end of the long sections supporting second retaining member;

a cart handle; and a pair of end caps;

such that, when the airless sprayer pump assembly is supported in the horizontal position, the first retaining member, provided with a pair of end caps, together with the wheeled axle provide horizontal base support for the cart and the cart handle is releasable secured to the second retaining member by a pair of cotter pins; and such that, when the airless sprayer pump assembly is supported in the upright position, the second retaining member, provided with the pair of end caps, together with the wheeled axle provide horizontal base support for the cart and the cart handle is releasable secured to the first retaining member by a pair of cotter pins.

2. A convertible cart according to claim 1, wherein, when the cart is in the upright position, a first suction tube is attached to a housing inlet of the pump assembly for suctioning paint from a paint pail and a pail hook is releasably secured to the second short section for hooking a paint pail in position for suction by said suction tube, such that, when the cart is pivoted slightly from the upright position for wheeling the cart, the paint pail remains securely hooked by the pail hook and rests on the second retaining members.

3. A convertible cart according to claim 1, wherein, when the cart is in the horizontal position, a second suction tube is attached to a housing inlet of the pump assembly for suctioning paint from a paint pail.

4. A method for supporting a paint sprayer in alternatively a horizontal or an upright position comprising the steps of:

a. providing a generally U-shaped cart base having a long section and first and second short sections forming essentially right angles at first and second ends, respectively, of the long section for retaining a generally rectangular pump assembly along one of the pump assembly's long dimension and two of the pump assembly's adjacent short dimensions, correspondingly, the angle of the first short section and the first end of the long section supporting a wheeled axle, the angle of the second short section and the second end of the long section supporting first retaining member, and an end of the first short section distal from the first end of the long sections supporting second retaining member; and b. providing a cart handle;

c. providing a pair of end caps;

such that, when the airless sprayer pump assembly is supported in the horizontal position, the pair of end caps are attached to the first retaining member, the first retaining member together with the wheeled axle provide horizontal base support for the cart and the cart handle is releasably secured to the second retaining member by a pair of cotter pins, and such that, when the airless sprayer pump assembly is supported in the upright position, the pair of end caps are attached to the second retaining member, the second retaining member together with the wheeled axle provide horizontal base support for the cart and the cart handle is releasably secured to the first retaining member by a pair of cotter pins.

5. The method according to claim 4, further comprising, when the cart is in the upright position, attaching a first suction tube to a housing inlet of the pump assembly for suctioning paint from a paint pail and releasably securing a pail hook to the second short section for hooking a paint pail in position for suction by said suction tube, such that, when the cart is pivoted slightly from the upright position for wheeling the cart, the paint pail remains securely hooked by the pail hook and rests on the second retaining member.

6. The method according to claim 4, further comprising, when the cart is in the horizontal position, attaching a second suction tube to a housing inlet of the pump assembly for suctioning paint from a paint pail.

7. A method of converting a paint sprayer cart from a horizontal to a vertical position, the cart carrying a paint sprayer on a base having a horizontally positioned long section interposed between a first short section and a second short section together forming a U-shaped profile with a wheeled axle secured to the base at the intersection of the long section and first short section, and the cart further having first and second retaining members projecting exteriorly from the cart from the first and second short sections, the method comprising the steps of:

a. releasing and removing a cart handle from the first retaining member of the cart base;
b. pivoting the cart base about the wheeled axle, such that the long section of the cart together with the attached paint sprayer is rotated from the horizontal position to a vertical position; and
c. attaching and securing the cart handle to the second retaining member
d. removing a pair of non-skid end caps from the second retaining member; and
e. attaching the pair of end caps to the first retaining member.

8. The method of claim 7, wherein step c further comprises releasably securing the cart handle to the second retaining member by a pair of cotter pins.

9. The method of claim 7, further comprising, when the cart is in the vertical position, attaching a first suction tube to a housing inlet of the pump assembly for suctioning paint from a paint pail and releasably securing a pail hook to the second short section for hooking a paint pail in position for suction by said suction tube, such that, when the cart is pivoted slightly from the vertical position for wheeling the cart, the paint pail remains securely hooked by the pail hook and rests on the second retaining members.

10. A method of converting a paint sprayer cart from a vertical to a horizontal position, the cart carrying a paint sprayer on a base having a vertically positioned long section interposed between a first short section and a second short section together forming a C-shaped profile with a wheeled axle secured to the base at the intersection of the long section and first short section, and the cart further having first and second retaining members projecting exteriorly from the cart from the first and second short sections, the method comprising the steps of:

a. releasing and removing a cart handle from the second retaining member of the cart base;
b. pivoting the cart base about the wheeled axle, such that the long section of the cart together with the attached paint sprayer is rotated to a horizontal position from the vertical position; and
c. attaching and securing the cart handle to the first retaining member
d. removing a pair of non-skid end caps from the first retaining member; and
e. attaching the pair of end caps to the second retaining member.

11. The method of claim 10, wherein step c further comprises releasably securing the cart handle to the first retaining member by a pair of cotter pins.

12. The method of claim 10, further comprising, when the cart is in the horizontal position, attaching a flexible suction tube to a housing inlet of the pump assembly for suctioning paint from a paint pail.

13. A convertible cart for a paint sprayer for alternatively supporting a pump assembly in a horizontal or an upright position comprising:

a) a cart base having
  i) a long section having first and second ends, and
  ii) first and second short sections attached to the long section at the first and second ends respectively,
b) a wheeled axle attached to the cart base at the first end of the long section;
c) a first u-shaped retaining member having a transverse portion and two arm portions, the transverse portion of the first retaining member being attached to the cart base at an end of the first short section distal from the first end of the long section;
d) a second u-shaped retaining member having a transverse portion and two arm portions, the transverse portion of the second retaining member being attached to the cart base at the second end of the long section;
e) a cart handle releasably secured to the arm portions of one of the first and second retaining members by a pair of cotter pins; and
f) a pair of end caps mounted on the arm portions of the other of the first and second retaining members.

* * * * *

UNITED STATES PATENT AND TRADEMARK OFFICE
CERTIFICATE OF CORRECTION

PATENT NO. : 5,217,238

DATED : June 8, 1993

INVENTOR(S) : Norman A. Cyphers & Wayne M. Bekius

It is certified that error appears in the above-identified patent and that said Letters Patent is hereby corrected as shown below:

In Co. 4, Line 13 after the word "first" delete "and" and insert therefor --end--.

Signed and Sealed this

Eighth Day of March, 1994

*Attest:*

BRUCE LEHMAN

*Attesting Officer*

*Commissioner of Patents and Trademarks*